(12) United States Patent
Kawasaki et al.

(10) Patent No.: US 9,804,549 B2
(45) Date of Patent: Oct. 31, 2017

(54) IMAGE FORMING APPARATUS

(71) Applicant: CANON KABUSHIKI KAISHA, Tokyo (JP)

(72) Inventors: Shuhei Kawasaki, Susono (JP); Kodai Hayashi, Suntou-gun (JP); Yoshihiro Mitsui, Numazu (JP); Shunsuke Matsushita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/176,450

(22) Filed: Jun. 8, 2016

(65) Prior Publication Data
US 2016/0370747 A1 Dec. 22, 2016

(30) Foreign Application Priority Data

Jun. 16, 2015 (JP) ................. 2015-121021
May 19, 2016 (JP) ................. 2016-100627

(51) Int. Cl.
G03G 15/08 (2006.01)
G03G 15/00 (2006.01)

(52) U.S. Cl.
CPC ....... *G03G 15/553* (2013.01); *G03G 15/0831* (2013.01); *G03G 15/0844* (2013.01); *G03G 15/0856* (2013.01)

(58) Field of Classification Search
CPC ............. G03G 15/0266; G03G 15/161; G03G 2221/0005; G03G 21/00; G03G 15/1625; G03G 2215/0177; G03G 15/0856; G03G 15/1605; G03G 15/553; G03G 21/0064; G03G 21/181; G03G 15/0813; G03G 15/086
See application file for complete search history.

(56) References Cited

U.S. PATENT DOCUMENTS

| 5,697,028 | A | 12/1997 | Kobayashi et al. |
| 7,583,916 | B2 | 9/2009 | Ogata et al. |
| 2011/0052220 | A1 | 3/2011 | Nose |
| 2013/0279921 | A1* | 10/2013 | Kanai ............. G03G 15/50 399/12 |

FOREIGN PATENT DOCUMENTS

| JP | H02-298971 A | 12/1990 |
| JP | H08-227212 A | 9/1996 |
| JP | 2006-023327 A | 1/2006 |

OTHER PUBLICATIONS

European Search Report dated Oct. 18, 2016, in related European Patent Application No. 16174340.6.

* cited by examiner

*Primary Examiner* — Roy Y Yi
(74) *Attorney, Agent, or Firm* — Fitzpatrick, Cella, Harper & Scinto

(57) ABSTRACT

An image forming apparatus has a photosensitive drum configured to bear a developer image, a developing apparatus having a developing roller that bears developer and a developing blade that regulates the amount of the developer on the developing roller, and a detection portion that detects information on the amount of the developer stored in the developing apparatus. The image forming apparatus performs a discharging operation for discharging a coating agent, applied to a developing roller in an unused state, from the developing apparatus to the photosensitive drum, while varying an operational condition for the discharging operation varied based on the information.

13 Claims, 10 Drawing Sheets

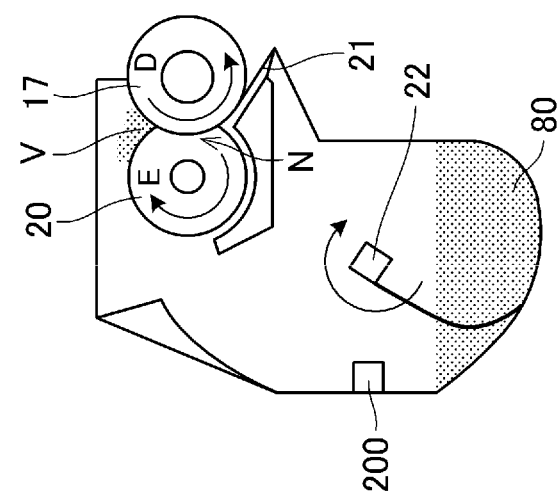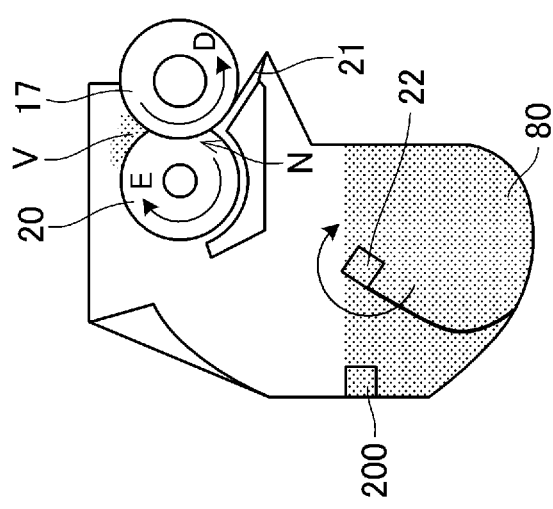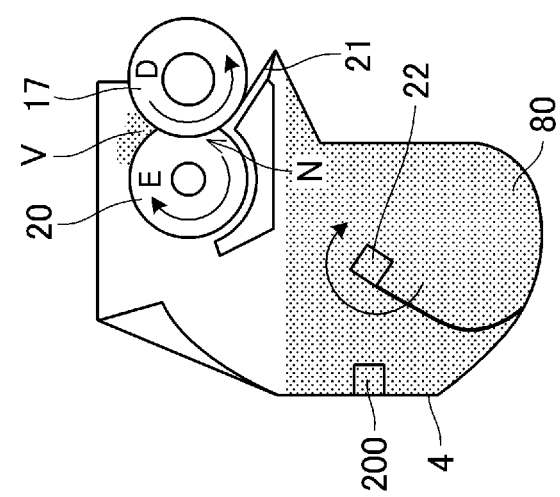

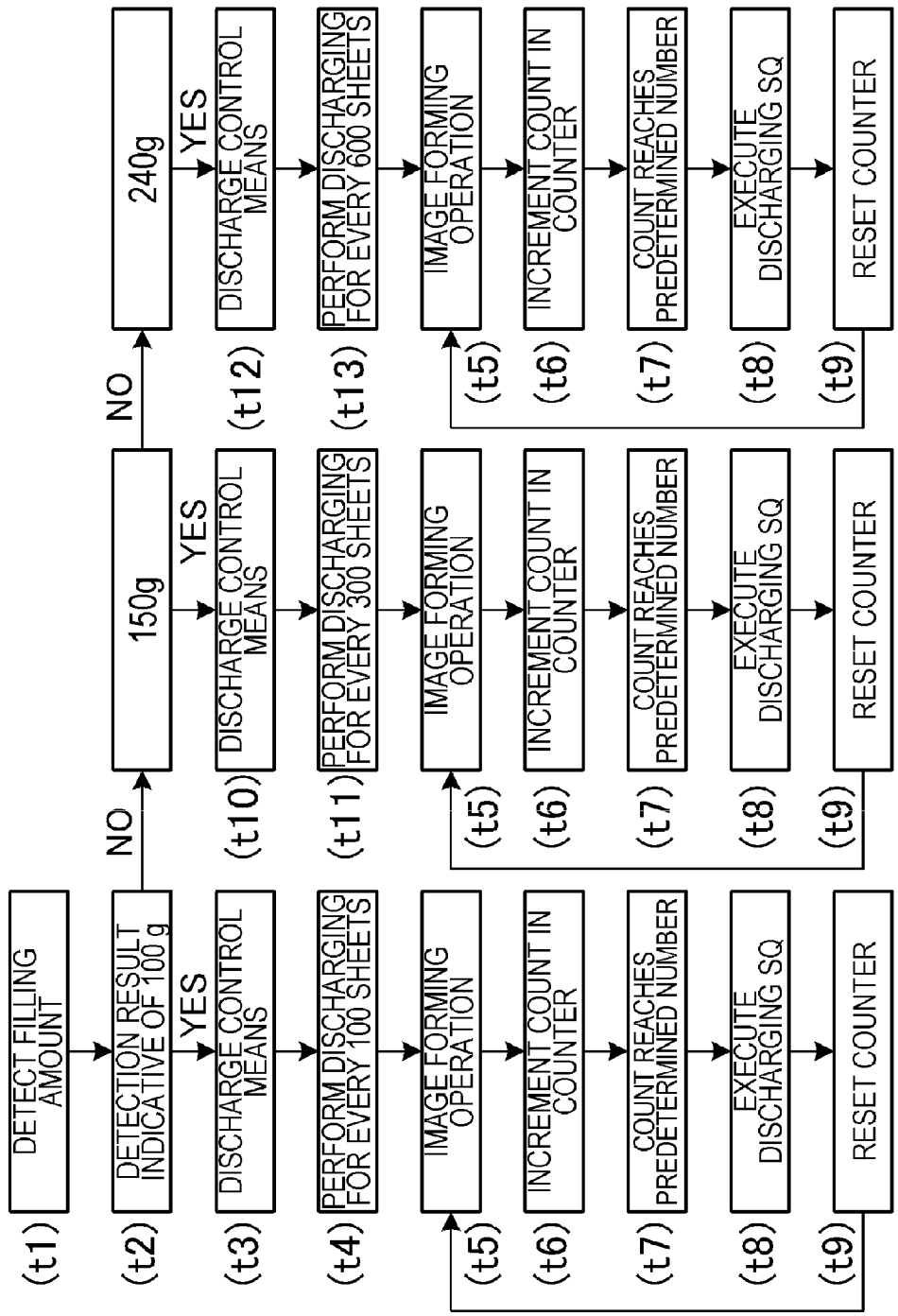

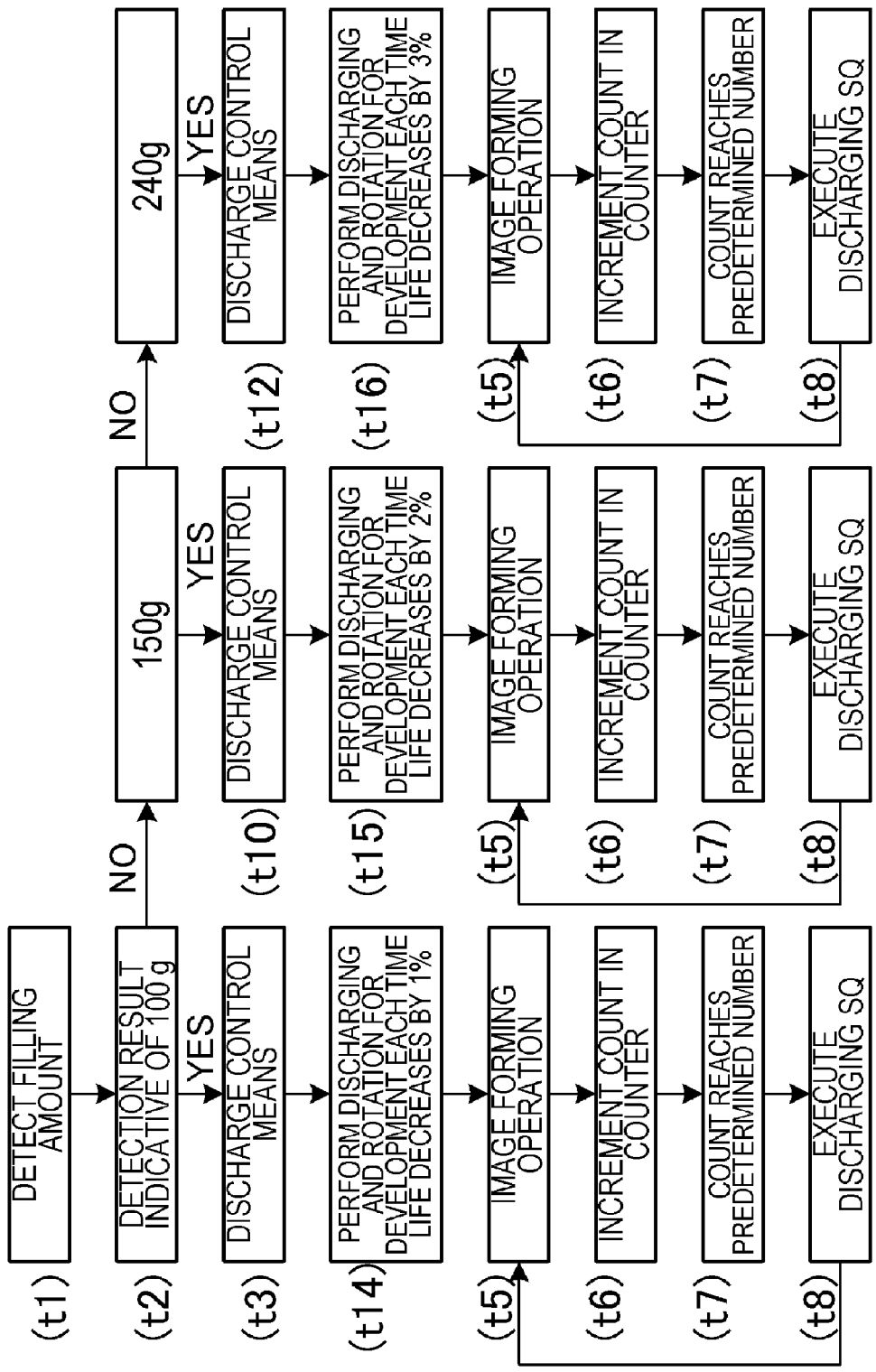

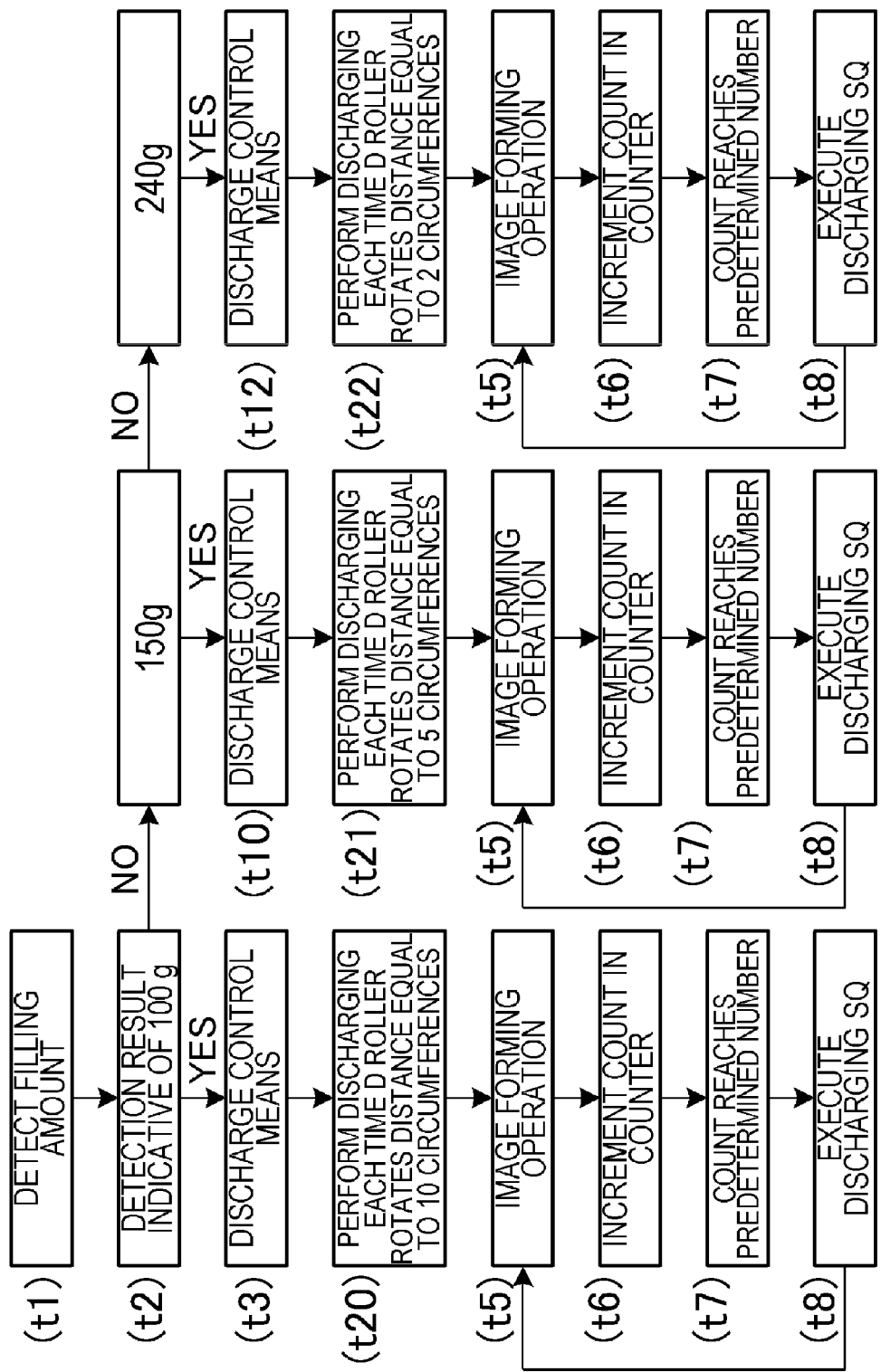

FIG.8

TABLE 1-1 RESULTS OF COMPARATIVE VERIFICATION 1

| NUMBER OF SHEETS FED | EMBODIMENT 1 | COMPARATIVE EXAMPLE 1 | COMPARATIVE EXAMPLE 2 | EMBODIMENT 2 | EMBODIMENT 3 | COMPARATIVE EXAMPLE 4 |
|---|---|---|---|---|---|---|
| 10000 | A | A | A | A | A | A |
| 12000 | A | A | A | A | A | A |
| 14000 | A | B | A | A | A | A |
| 16000 | A | C | B | A | A | A |
| 18000 | A | C | C | A | A | A |
| 20000 | A | C | C | A | A | A |
| 21000 | A | C | C | A | A | A |
| 22000 | A | C | C | A | A | A |

TABLE 1-2 RESULTS OF COMPARATIVE VERIFICATION 2

| AMOUNT OF TONER | EMBODIMENT 1 | COMPARATIVE EXAMPLE 1 | COMPARATIVE EXAMPLE 2 | EMBODIMENT 2 | EMBODIMENT 3 | COMPARATIVE EXAMPLE 4 |
|---|---|---|---|---|---|---|
| 100g | ○ | ○ | ○ | ○ | ○ | ○ |
| 80g | ○ | ○ | ○ | ○ | ○ | ○ |
| 60g | ○ | ○ | ○ | ○ | ○ | ○ |
| 40g | ○ | × | × | ○ | ○ | ○ |
| 30g | ○ | × | × | ○ | ○ | ○ |
| 20g | ○ | × | × | ○ | ○ | ○ |
| 10g | ○ | × | × | ○ | ○ | ○ |
| 5g | ○ | × | × | ○ | ○ | ○ |

TABLE 1-3 RESULTS OF COMPARATIVE VERIFICATION 3

| AMOUNT OF TONER | EMBODIMENT 1 | COMPARATIVE EXAMPLE 1 | COMPARATIVE EXAMPLE 2 | EMBODIMENT 2 | EMBODIMENT 3 | COMPARATIVE EXAMPLE 4 |
|---|---|---|---|---|---|---|
| 100g | ○ | ○ | ○ | ○ | ○ | ○ |
| 80g | ○ | ○ | ○ | ○ | ○ | ○ |
| 60g | ○ | ○ | ○ | ○ | ○ | ○ |
| 40g | ○ | ○ | ○ | ○ | ○ | ○ |
| 30g | ○ | × | × | ○ | ○ | ○ |
| 20g | ○ | × | × | ○ | ○ | ○ |
| 10g | ○ | × | × | ○ | ○ | ○ |
| 5g | ○ | × | × | ○ | ○ | ○ |

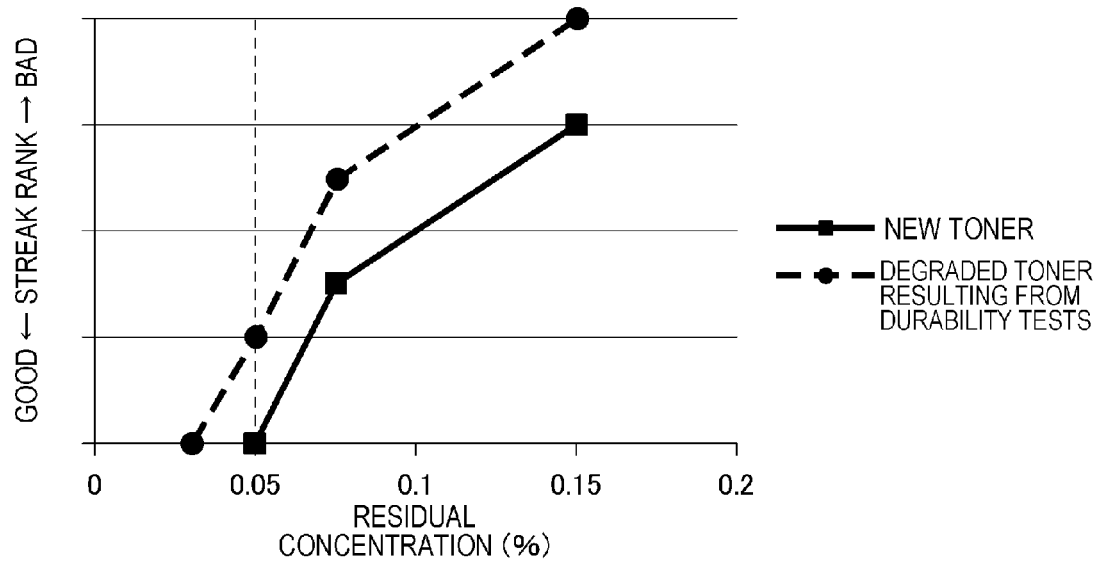

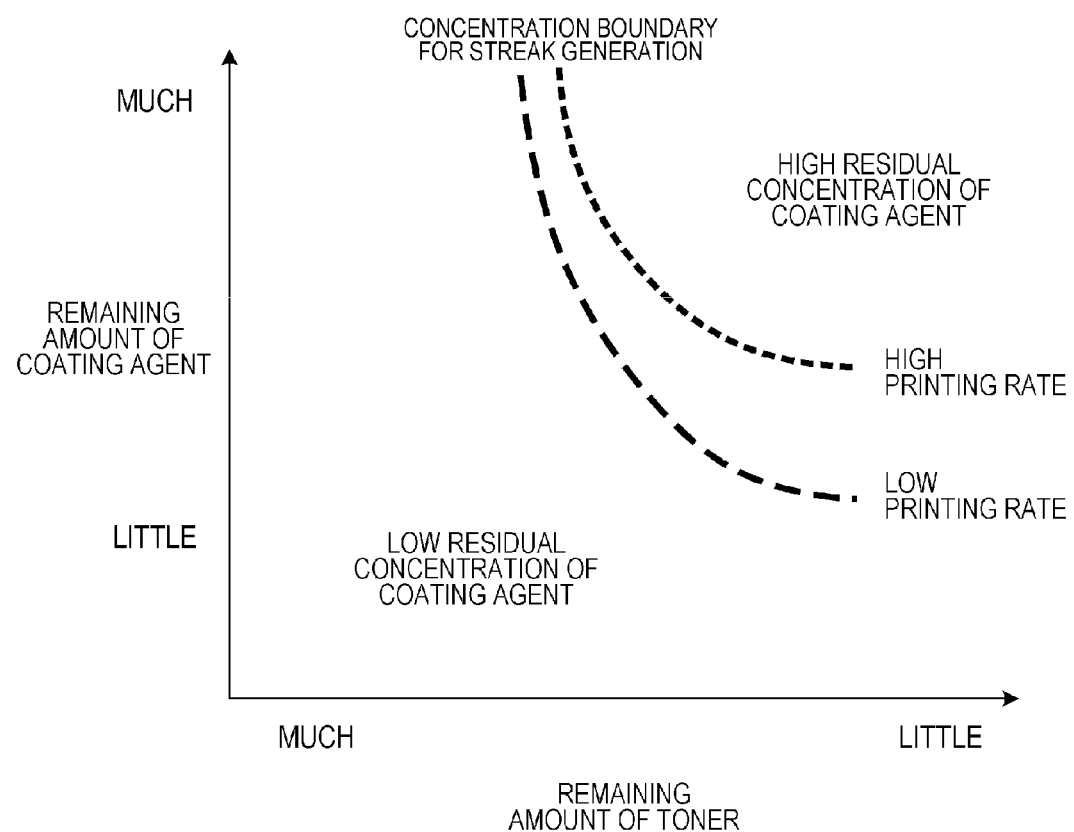

IMAGE FORMING APPARATUS

BACKGROUND OF THE INVENTION

Field of the Invention

The present invention relates to an image forming apparatus.

Description of the Related Art

In image forming apparatuses such as printers which use an electrophotographic image forming system (electrophotographic process), image recording is performed in the following manner: an electrophotographic photosensitive member (hereinafter referred to as a "photosensitive member") serving as an image bearing member is uniformly charged; the charged photosensitive member is selectively exposed to form an electrostatic image on the photosensitive member; the electrostatic image formed on the photosensitive member is visualized as a toner image using toner in developer; then, the toner image formed on the photosensitive member is transferred to a recording material such as a recording sheet or a plastic sheet; and the toner image transferred to the recording material is further heated and pressurized so as to be fixed onto the recording material.

Such an image forming apparatus generally needs refilling of developer and maintenance of various process means. To facilitate the developer refilling operation and the maintenance of the various process means, a technique has been put to practical use in which the photosensitive member, charging member, developing means, cleaning means, and the like are collectively stored in a frame member to form a process cartridge that can be installed in and removed from the image forming apparatus. The process cartridge system enables the provision of an image forming apparatus with high usability.

In conventional developing apparatuses used for image forming apparatuses, a method of applying a coating agent (lubricant) to a developing roller (developer bearing member) in order to suppress turn-up of a regulating blade (developer regulating member) and to reduce a driving torque has been widely used. In Japanese Patent Application Laid-open No. H2-298971, powder with the same polarity as that of toner is used as a coating agent for the developing roller. Japanese Patent Application Laid-open No. H8-227212 proposes that, as a coating agent, the following be coated at least on a surface of the toner supply roller (developer supply member): powder with no charging capability or powder that is charged with the same polarity as the developer and that has a charging capability having an absolute value equivalent to or smaller than the charging capability of the developer. On the other hand, a technique for conventional image forming apparatuses is widely known in which the developer is periodically discharged so as to be restrained from being degraded. Japanese Patent Application Laid-open No. 2006-23327 indicates that, in order to suppress degradation of the toner in the developer, an operation of periodically discharging the developer is performed such that toner consumption for each page is constant.

The situation described below may occur when a coating agent is used in the manner of Japanese Patent Application Laid-open No. H2-298971 and Japanese Patent Application Laid-open No. H8-227212. During the latter half of life of the image forming apparatus, durability of the developer or durability of a developing roller or a developing blade is degraded to deteriorate charging characteristics of the toner. Then, an initial coating agent remaining in a developing chamber may move to the recording material along with a toner image at the time of image formation. The coating agent attached to the recording material may appear as streaks on the image or streak-like fogging images on a blank portion of the paper. Thus, the coating agent initially applied to the developing roller is desirably discharged to the outside of the developing chamber quickly.

However, for such a discharging method and a discharge frequency according to the related art as described in Japanese Patent Application Laid-open No. 2006-23327, the coating agent may fail to be fully discharged and remain in the developing chamber. When image formation is performed with the coating agent remaining in the developing chamber, the durability of the developer may be deteriorated or the developing roller may be degraded to deteriorate the charging characteristics of the toner, causing the coating agent to move to the recording material along with the toner image. This may also result in abnormal images such as streaks and fogged images.

SUMMARY OF THE INVENTION

An object of the present invention is to provide a technique enabling a reduction in movement of a coating agent, applied to a developer bearing member, to a recording material along with a developer image.

To accomplish the object, an image forming apparatus according to the present invention comprises:

an image bearing member configured to bear a developer image;

a developing apparatus having a developer bearing member that bears developer and a regulating member that regulates an amount of the developer on the developer bearing member;

a detection portion that detects the amount of the developer stored in the developing apparatus; and a control portion that performs a discharging operation for discharging the developer from the developing apparatus, apart from an image forming operation, wherein the developer bearing member bears a coating agent during an unused state, and in the discharging operation, an amount of the developer discharged when a first amount of the developer stored is detected is larger than a second amount of the developer discharged when a second amount of the developer stored that is larger than the first amount of the developer stored is detected.

To accomplish the object, an image forming apparatus according to the present invention comprises:

a developing apparatus including a developer bearing member that bears developer and a regulating member that regulates an amount of the developer borne by the developer bearing member and that charges the developer; and a detection portion that detects the amount of the developer stored in the developing apparatus, the image forming apparatus executing a discharging operation that is different from an image forming operation of forming a developer image on a recording material and that moves the developer from the developer bearing member to an image bearing member, wherein a coating agent that is powder other than the developer is applied to the developer bearing member during an unused state, and the image forming apparatus comprises a control portion that varies an execution frequency of the discharging operation so as to increase the execution frequency of the discharging operation with respect to an execution frequency of the image forming operation as the amount of the developer detected by the detection portion decreases.

The present invention enables a reduction in movement of a coating agent, applied to a developer bearing member, to a recording material along with a developer image.

Further features of the present invention will become apparent from the following description of exemplary embodiments with reference to the attached drawings.

BRIEF DESCRIPTION OF THE DRAWINGS

FIGS. 3A to 3C are schematic sectional views of a developing apparatus in the embodiment;

FIG. 4 is a flowchart of a discharging operation in Embodiment 1;

FIG. 5 is a flowchart of a discharging operation in Embodiment 2;

FIG. 7 is a flowchart of a discharging operation in Embodiment 4;

FIG. 8 is a table indicating results of comparative verification for the embodiment;

FIG. 9 is a graph indicating results of comparative verification for the embodiment; and FIG. 10 is a diagram illustrating results for the embodiment.

DESCRIPTION OF THE EMBODIMENTS

The following provides a detailed exemplary explanation of embodiments of this invention based on examples with reference to the drawings. However, the dimensions, materials, shapes and relative arrangement of constituent components described in the embodiments may be suitably modified according the configuration and various conditions of the apparatus to which the invention is applied. Namely, the scope of this invention is not intended to be limited to the following embodiments.

Embodiment

An electrophotographic image forming apparatus according to an embodiment of the present invention will be described. Using an electrophotographic image forming system, the electrophotographic image forming apparatus (hereinafter also referred to as the "image forming apparatus") forms an image on a recording material using developer (hereinafter referred to as "toner"). Examples of the image forming apparatus include a copier, a printer (a laser beam printer, a LED printer, or the like), a facsimile machine, a word processor, and a multi-function printer.

For the configuration and operation of a developing unit (or a developing apparatus) or a process cartridge, the terms such as "upper", "lower", "vertical", and "horizontal" as used herein to represent directions refer to directions of the developing unit or the process cartridge as viewed during normal use thereof, unless otherwise specified. In other words, the normal use of the developing unit (developing apparatus) or the process cartridge is a state where the developing unit (developing apparatus) or the process cartridge is properly installed in the properly arranged image forming apparatus main body so as to be used for an image forming operation.

[Image Forming Apparatus]

Figure 1:
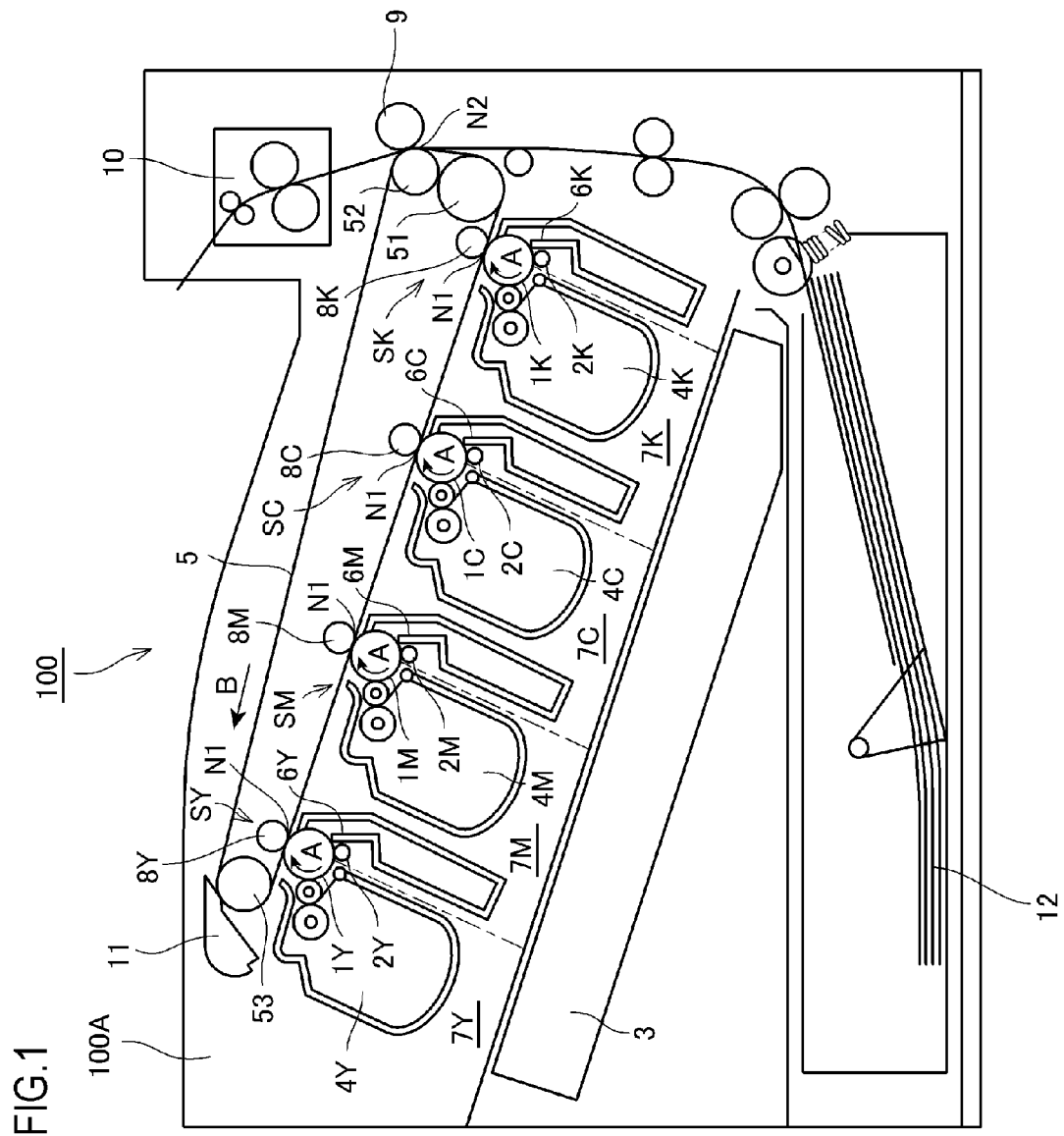
FIG. 1 is a schematic sectional view of an image forming apparatus according to an embodiment.

FIG. 1 is a schematic sectional view depicting a general configuration of an image forming apparatus 100 according to the present embodiment. The image forming apparatus 100 in the present embodiment is a full-color laser printer adopting an in-line system and an intermediate transfer system. The image forming apparatus 100 can form a full-color image on a recording material (for example, a recording sheet, a plastic sheet, or a cloth) in accordance with image information. The image information is input to an image forming apparatus main body 100A through host equipment such as an image reading apparatus connected to the image forming apparatus main body 100A or a personal computer that is connected to, and capable of communicating with, the image forming apparatus main body 100A.

The image forming apparatus 100 has, as a plurality of image forming sections, a first image forming portion SY, a second image forming portion SM, a third image forming portion SC, and a fourth image forming portion SK configured to form images in yellow (Y), magenta (M), cyan (C), and black (K), respectively. In the present embodiment, the first to fourth image forming sections SY, SM, SC, and SK are arranged in line in a direction crossing the vertical direction. In the present embodiment, the first to fourth image forming sections SY, SM, SC, and SK have the same configuration and perform the same operation except for the color of an image formed by each image forming portion. The image forming sections will be comprehensively described by omitting the suffixes Y, M, C, and K added to the reference character in order to indicate for which of the colors the corresponding element is provided, unless the image forming sections need to be distinguished from one another. Of course, image forming sections with different sizes or shapes may be provided in the image forming apparatus depending on the configuration thereof.

The image forming apparatus 100 has four drum-shaped electrophotographic photosensitive members juxtaposed in a direction crossing the vertical direction, that is, photosensitive drums 1. The photosensitive drums 1 are rotationally driven in a direction of arrow A (clockwise) by driving means (driving source) not depicted in the drawings. Around each of the photosensitive drums 1, a charging roller 2 is arranged which serves as charging means for uniformly charging a surface of the photosensitive drum 1, and a scanner unit (exposure apparatus) 3 is also arranged which serves as exposure means for forming an electrostatic image (electrostatic latent image) on the photosensitive drum 1 by irradiation with laser light based on image information. Around each of the photosensitive drums 1, a developing unit (developing apparatus) 4 is arranged which serves as developing means for developing an electrostatic image into a toner image, and a cleaning member 6 is also arranged which serves as cleaning means for removing toner (untransferred toner) remaining on the surface of the photosensitive drum 1 after transfer. Opposite to the four photosensitive drums 1, an intermediate transfer belt 5 is arranged which serves as an intermediate transfer member configured to transfer a toner image (developer image) on the photosensitive drum 1 to a recording material 12.

In the present embodiment, the developing unit 4 uses nonmagnetic one-component developer toner as developer. In the present embodiment, the developing unit 4 performs reversal development by bringing a developing roller (described below) serving as a developer bearing member into contact with the photosensitive drum 1. That is, in the present embodiment, the developing unit 4 develops an electrostatic image by attaching toner charged with the same polarity (in the present embodiment, a negative polarity) as that to which the photosensitive drum 1 is charged, to a portion (an image portion or an exposed portion) of the photosensitive drum 1 on which charge has been attenuated by exposure.

In the present embodiment, the photosensitive drum 1, and the charging roller 2, the developing unit 4, and the cleaning member 6, which serve as process means acting on the photosensitive drum 1, are integrated together, that is, integrated into a process cartridge 7. The process cartridge 7 can be installed in and removed from the image forming apparatus 100 via installation means such as an installation guide and a positioning member provided in the image forming apparatus main body 100A. In the present embodiment, process cartridges 7 for the respective colors all have the same shape and store toner in yellow (Y), magenta (M), cyan (C), and black (K), respectively.

The intermediate transfer belt 5 formed using an endless belt and serving as an intermediate transfer member contacts all the photosensitive drums 1 and moves (rotates) cyclically in the direction of arrow B (counterclockwise) in FIG. 1. The intermediate transfer belt 5 is passed around a driver roller 51, a secondary transfer opposite roller 52, and a driven roller 53 that serve as a plurality of support members.

On an inner peripheral side of the intermediate transfer belt 5, four primary transfer rollers 8 are juxtaposed opposite the respective photosensitive drums 1 as primary transfer means. Each of the primary transfer rollers 8 presses the intermediate transfer belt 5 toward the corresponding photosensitive drum 1 to form a primary transfer portion N1 where the intermediate transfer belt 5 and the photosensitive drum 1 contact each other. A bias with a polarity opposite to the regular charging polarity of toner is applied to the primary transfer roller 8 by a primary transfer bias power supply (high-voltage power supply) serving as primary transfer bias applying means and not depicted in the drawings. Consequently, a toner image on the photosensitive drum 1 is (primarily) transferred onto the intermediate transfer belt 5.

At an outer peripheral side of the intermediate transfer belt 5, a secondary transfer roller 9 serving as secondary transfer means is arranged opposite the secondary transfer opposite roller 52. The secondary transfer roller 9 is compressed against the secondary transfer opposite roller 52 via the intermediate transfer belt 5 to form a secondary transfer portion N2 where the intermediate transfer belt 5 and the secondary transfer roller 9 contact each other. A bias with a polarity opposite to the regular charging polarity of toner is applied to the secondary transfer roller 9 by a secondary transfer bias power supply (high-voltage power supply) serving as secondary transfer bias applying means and not depicted in the drawings. Consequently, a toner image on the intermediate transfer belt 5 is (secondarily) transferred onto the recording material 12.

At the time of image formation, first, the surface of the photosensitive drum 1 is uniformly charged by the charging roller 2. Then, the surface of the charged photosensitive drum 1 is subjected to scanning exposure with laser light emitted from the scanner unit 3, the laser light being is association with image information, to form an electrostatic image on the photosensitive drum 1 in accordance with the image information. Then, the electrostatic image formed on the photosensitive drum 1 is developed into a toner image by the developing unit 4. The toner image formed on the photosensitive drum 1 is (primarily) transferred onto the intermediate transfer belt 5 by action of the primary transfer roller 8. For example, when a full-color image is formed, the above-described process is sequentially executed on the first to fourth image forming sections SY, SM, SC, and SK. Toner images in the respective images are primarily transferred onto the intermediate transfer belt 5 in a superimposed manner.

Subsequently, the recording material 12 is conveyed to the secondary transfer portion N2 in synchronism with movement of the intermediate transfer belt 5. The four-color toner images on the intermediate transfer belt 5 are, in collective fashion, secondarily transferred onto the recording material 12 by action of the secondary transfer roller 9, which is in contact with the intermediate transfer belt 5 via the recording material 12. The recording material 12 with the toner images transferred thereto is conveyed to a fixing apparatus 10 serving as fixing means. The fixing apparatus 10 heats and pressurizes the recording material 12 to fix the toner images to the recording material 12.

Primarily untransferred toner remaining on the photosensitive drum 1 after the primary transfer step is removed and collected by the cleaning member 6. Secondarily untransferred toner remaining on the intermediate transfer belt 5 after the secondary transfer step is cleaned by an intermediate transfer belt cleaning apparatus 11. Note that the image forming apparatus 100 can also form monochromatic or multicolor images by using one desired piece of image forming sections singly or by using only a part (not all) of the image forming sections.

[Process Cartridge]

Figure 2:
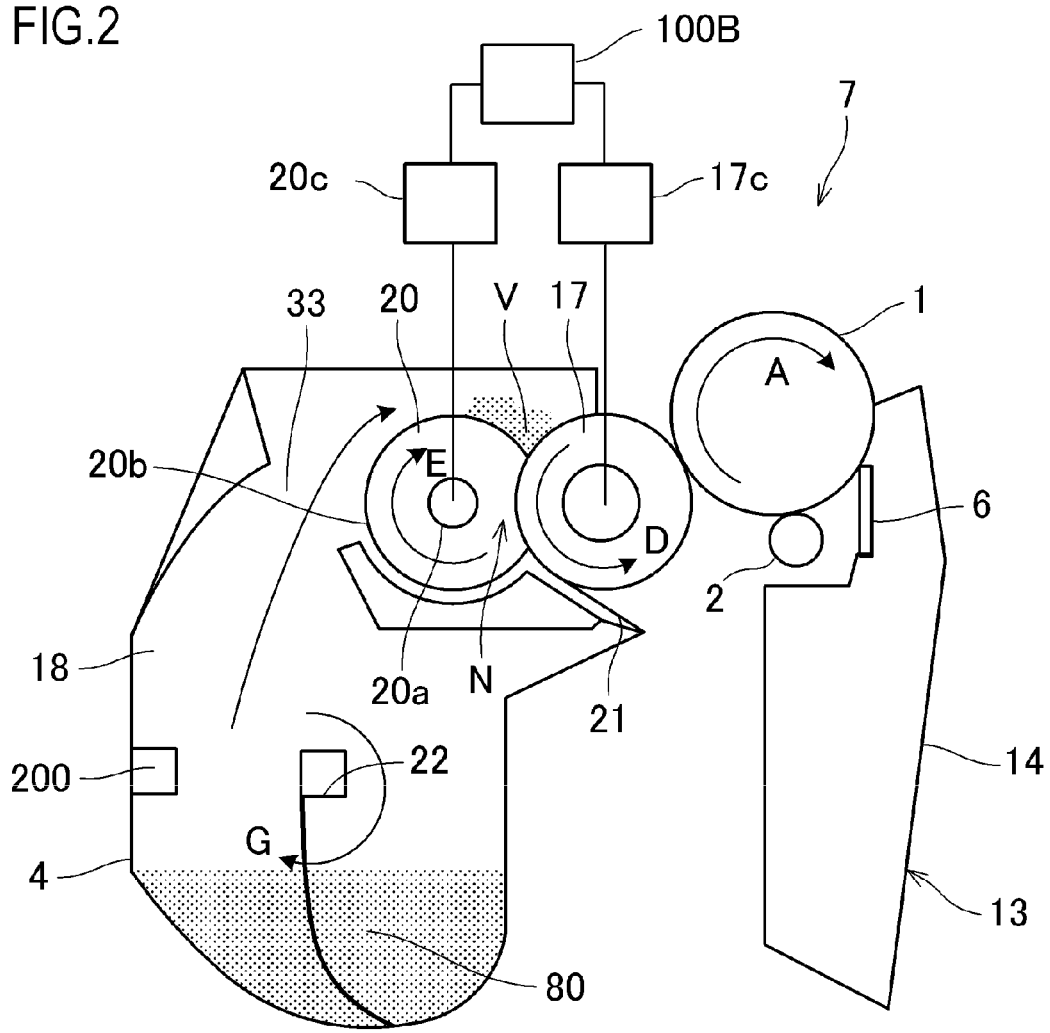
FIG. 2 is a schematic sectional view of a process cartridge in the embodiment.

With reference to FIG. 2, a general configuration of the process cartridge 7, which is installed in the image forming apparatus 100, will be described. FIG.2 is a schematic (principal) sectional view of the process cartridge 7 in the present embodiment as viewed along a longitudinal direction (direction of a rotation axis) of the photosensitive drum 1. In the present embodiment, the process cartridges 7 for the respective colors have substantially the same configuration and perform substantially the same operation except for the type (color) of the developer stored in the process cartridge 7. The process cartridge 7 includes a photosensitive member unit 13 including the photosensitive drum 1 and the developing unit 4 including a developing roller 17; the photosensitive member unit 13 and the developing unit 4 are integrated together.

The photosensitive member unit 13 has a cleaning frame member 14 that supports the various elements in the photosensitive member unit 13. The photosensitive drum 1 is rotatably attached to the cleaning frame member 14 via a bearing not depicted in the drawings. The photosensitive drum 1 is rotationally driven in the direction of arrow A in FIG. 2 (clockwise) in accordance with an image forming operation by transmission, to the photosensitive member unit 13, of a driving force of a driving motor serving as driving means (driving source) not depicted in the drawings. In the present embodiment, the photosensitive drum 1, which plays a major role in an image forming process, is an organic photosensitive drum 1 that is an aluminum cylinder coated with an undercoat layer that is a functional film, a carrier generation layer, and a carrier transfer layer in this order on an outer peripheral surface thereof.

In the photosensitive member unit 13, the cleaning member 6 and the charging roller 2 are arranged in contact with a peripheral surface of the photosensitive drum 1. The untransferred toner removed from the surface of the photosensitive drum 1 by the cleaning member 6 falls into the cleaning frame member 14, where the toner is stored (cleaning portion).

The charging roller 2, which is charging means, is rotationally driven by bringing a conductive-rubber roller portion of the charging roller 2 into contact with the photosensitive drum 1 under pressure. In a charging step, a predetermined DC voltage is applied to a cored bar of the charging roller 2 with respect to the photosensitive drum 1. Consequently, a uniform dark part potential (Vd) is formed on the surface of the photosensitive drum 1. A spot pattern of laser light from the above-described scanner unit 3 in association with image data exposes the photosensitive drum 1. In an exposed segment, carriers from the carrier generation layer eliminate the charge from the surface to reduce the potential. As a result, on the photosensitive drum 1, an electrostatic latent image with a predetermined bright part potential (Vl) is formed in the exposed segment, and an electrostatic latent image with a predetermined dark part potential (Vd) is formed in an unexposed segment. In the present embodiment, Vd=−520 V and Vl=−100 V.

The developing unit 4 has a developing chamber where the developing roller 17 and a toner supply roller 20 are arranged; the developing roller 17 serves as a developer bearing member configured to bear developer (toner) 80 and the toner supply roller 20 serving as a developer supply member that supplies toner to the developing roller 17. The developing unit 4 further includes a developer storage chamber, that is, a toner storage chamber 18 (developer storage portion) arranged below the toner supply roller 20 in the direction of gravity and communicating with the developing chamber through a developing opening 33 and storing the toner 80. The toner supply roller 20 rotates in contact with the developing roller 17 via a nip portion N.

In the toner storage chamber 18, a stirring and conveying member 22 is provided which stirs the toner in the toner storage chamber 18 and which conveys the toner in the direction of arrow G in FIG. 2 toward an area over the toner supply roller 20 denoted by V.

The present embodiment uses the developing blade as a regulating member that regulates the amount of the developer on the developer bearing member.

The developing blade 21 is arranged under the developing roller 17 and contacts the developing roller 17 in a counter direction to regulate the coating amount of the toner supplied by the toner supply roller 20 and to apply charge to the toner. In the present embodiment, a leaf-spring-like thin plate formed of SUS and having a thickness of 0.1 mm is used as the developing blade 21, and the spring elasticity of the thin plate is utilized to exert contact pressure. A surface of the developing blade 21 is brought into contact with the toner and the developing roller 17. The developing blade is not limited to this but may be a thin metal plate such as phosphor bronze or aluminum. Furthermore, the surface of the developing blade 21 may be coated with a thin film of a polyamide elastomer, urethane rubber, or a urethane resin. The toner is provided with charge by triboelectric charging resulting from rubbing between the developing blade 21 and the developing roller 17 while being simultaneously regulated for layer thickness. In the present embodiment, a blade bias power supply not depicted in the drawings applies a predetermined voltage to the developing blade 21 to stabilize the toner coating. In the present embodiment, a blade bias V of −400 V is applied.

The developing roller 17 and the photosensitive drum 1 rotate such that, in an opposite portion (contact portion), the surfaces of the developing roller 17 and the photosensitive drum 1 move in the same direction (in the present embodiment, an upward direction). In the present embodiment, the developing roller 17 is arranged in contact with the photosensitive drum 1. However, the developing roller 17 may be arranged in proximity to and at a predetermined distance from the photosensitive drum 1. In the present embodiment, the toner triboelectrically charged with the negative polarity with respect to the predetermined DC bias applied to the developing roller 17 by the bias power supply 17c is transferred, due to this potential difference, only to the bright potential part of the development portion where the toner comes into contact with the photosensitive drum 1, thus visualizing the electrostatic latent image. In the present embodiment, a voltage V of −300 V is applied to the developing roller to generate a potential difference from the bright potential part ΔV of 200 V, thus forming a toner image.

The toner supply roller 20 is disposed to form the predetermined contact portion (nip portion) N in the opposite portion on a peripheral surface of the developing roller 17. The toner supply roller 20 rotates in the direction of arrow E in FIG. 2 (clockwise). The toner supply roller 20 is an elastic sponge roller including a conductive cored bar with a foaming member layer formed on an outer peripheral surface thereof. The toner supply roller 20 and the developing roller 17 are in contact with each other at a predetermined penetration level, that is, such that the toner supply roller 20 is concaved by the developing roller 17 in a concave amount ΔE, in FIG. 2. The toner supply roller 20 and the developing roller 17 rotate in the contact portion N at different peripheral speeds in the same direction. This operation allows the toner supply roller 20 to supply toner to the developing roller 17. At this time, the amount of the toner supplied to the developing roller 17 can be adjusted by regulating the potential of the toner supply roller 20 so as to set an appropriate difference in potential between the toner supply roller 20 and the developing roller 17. In the present embodiment, the toner supply roller 20 and the developing roller 17 are driven to rotate at 200 rpm and at 100 rpm, respectively, and the DC bias is applied such that the potential V of the developing roller 17 is +50 V with respect to the potential of the toner supply roller 20.

The developing roller 17 and the toner supply roller 20 in the present embodiment both have an outside diameter of 15 mm. The penetration level at which the toner supply roller 20 penetrates the developing roller 17 is set to 1.0 mm, that is, the concave amount ΔE in which the toner supply roller 20 is concaved by the developing roller 17 is set to 1.0 mm. The toner supply roller 20 and the developing roller 17 are arranged so as to have the same central height. The toner supply roller 20 used in the present embodiment includes a conductive support member and a foaming member supported by the conductive support member. Specifically, the toner supply roller 20 is provided with a cored bar electrode 20a serving as the conductive support member and having an outside diameter ϕ5 (mm) and a urethane foam layer 20b located around the cored bar electrode 20a and serving as the foaming layer and containing open cells connected together. The toner supply roller 20 rotates in the direction of arrow E in FIG. 2. Since the urethane in the front layer contains open cells, a large amount of the toner can enter the inside of the toner supply roller 20. The toner supply roller 20 in the present embodiment offers a resistance of $1\times10^9(\Omega)$. As described below, the surface of the developing roller in an unused state is coated with a lubricant coating agent.

A method for measuring the resistance of the toner supply roller 20 will be described. The toner supply roller 20 is brought into contact with an aluminum sleeve with a diameter of 30 mm at a penetration level, described below, of 1.5 mm. The aluminum sleeve is rotated to rotate the toner supply roller 20 at 30 rpm in conjunction with rotation of the aluminum sleeve. Then, a DC voltage of −50 V is applied to the aluminum sleeve. In this case, a resistor of 10 kΩ is provided on a ground side, and the resistance of the toner supply roller 20 is calculated by measuring the potential at each of the opposite ends of the resistor and calculating a current from the voltages. In the present embodiment, the toner supply roller 20 has a surface cell diameter of 50 µm to 1000 µm.

The cell diameter as used herein refers to the average diameter of foaming cells in any section. First, the area of the largest foaming cell is measured based on an enlarged image of any section, and a perfect-circle-equivalent diameter is calculated from the resultant area to obtain the maximum cell diameter. Then, foaming cells with a diameter equal to or smaller than half the maximum cell diameter are considered to be noise and removed, and individual cell diameters are similarly calculated from the cell areas of the remaining individual cells. The average value of the resultant cell diameters is referred to as the cell diameter.

Subsequently, circulation of the toner in the developing chamber in a case where the toner supply roller 20 rotates in the direction of arrow E in FIG. 2 will be described. First, the toner stored in the toner storage portion 18 is thrown up by the toner conveying member 22 and mostly conveyed onto the supply roller 20. The toner conveyed to the supply roller 20 remains on the surface of the supply roller 20 and inside the supply roller 20. The supply roller 20 then rotates in the direction of arrow E in FIG. 2 to convey the toner to a position immediately before the nip between the supply roller 20 and the developing roller 17. A portion of the supply roller 20 on which the toner is conveyed is then deformed at the position immediately before the nip between the supply roller 20 and the developing roller 17. The deformation causes discharging of the toner remaining on the surface of the supply roller 20 and inside the supply roller 20. The discharged toner is stored in a space (hereinafter referred to as a "temporary toner storage portion V") over the developing roller 17 and the supply roller 20.

A portion of the toner stored in the temporary toner storage portion V is blown into the nip portion N as a result of the rotation of the developing roller 17 and the supply roller 20. The toner blown into the nip portion N is charged due to the rubbing between the developing roller 17 and the supply roller 20. Upon passing through the nip portion N, the charged toner is electrostatically stuck to the developing roller 17 due to an amount of charge in the toner. This effect allows the toner to be fed from the supply roller 20 to the developing roller 17. A portion of the toner fed to the developing roller 17 is regulated by the developing blade 21, which is a developer regulating member, to form a toner coat with a desired layer thickness over the developing roller 17. The regulated toner falls by gravity to return to the toner storage portion 18.

As described above, the toner stored in the temporary toner storage portion V is fed to the developing roller 17 to form a toner coat. In other words, stable formation of a toner coat needs a configuration that continues to supply a desired amount of the toner to the temporary toner storage portion V.

[Coating Agent]

Now, a coating agent applied to the developing roller 17 in the present embodiment will be described in detail. Powder other than the toner is used for the developing roller 17 in the present embodiment in order to protect the developing roller 17 from the time of manufacture until a user starts to use the developing roller 17 and to allow the powder to function as a lubricant for the developing blade 21 when the developing blade 21 starts to be used. Approximately 10 to 150 mg of the coating agent is applied to the developing roller 17. In the present embodiment, the powder used as the coating agent 22 is Tospearl (trade name) manufactured by Momentive Performance Materials Inc (formerly Toshiba Silicone Co., Ltd.). The coating agent 22 is 2 µm in average particle size. The coating agent 22 adopted in the present embodiment is characterized by having higher charge than the toner used for development. Specifically, in an environment at a temperature of 23° C. and a humidity of 40%, compared to the toner, which has an initial average charge of approximately 50 µC/g per unit mass, Tospearl has an average charge of 90 µC/g per unit mass. Any known developer may be used as needed so long as the developer is a nonmagnetic one-component developer having lower charging characteristics than the coating agent as described above. The developer preferably has a larger average particle size than the coating agent.

The present embodiment uses Tospearl with a particle size of 2 µm. However, the present invention is not limited to this. Any coating agent may be used as needed so long as the coating agent functions without causing the developing blade 21 to be curled back. Specifically, materials and particle sizes described below are used for the coating agent 22 in view of the electrical characteristics thereof exhibited with respect to the developing roller 17 and the developing blade 21. Examples of the material include a urethane resin, a silicone resin, a polyester resin, a styrene resin, an acrylic resin, a styrene-acrylic resin, or a blend resin thereof. A charge control agent, a wax, and the like are kneaded into any of these resins, which is then pulverized by a known pulverization method to form matrix particles. Alternatively, an external additive may be applied. For the particle size, a combination of materials is possible, as appropriate, within the range from 0.8 µm to 10 µm.

[Filling Amount of the Developer]

With reference to FIGS. 3A to 3C, the amount of the developer placed in the developing apparatus 4 in the present embodiment will be described in detail. For the developing apparatus 4, three different levels are available for the filling amount of the toner. That is, in the image forming apparatus according to the present embodiment, three types of developing apparatuses 4 including toner chambers having different filling amounts of toner in an unused state (initial state) are each configured so that the developing apparatus 4 can be installed in and removed from the apparatus main body 100A. FIGS. 3A to 3C are schematic sectional views of the developing apparatus 4 in the present embodiment. FIG. 3A depicts a developing apparatus 4 of a type having an initial filling amount of 240 g. FIG. 3B depicts a developing apparatus 4 of a type having an initial filling amount of 150 g. FIG. 3C depicts a developing apparatus 4 of a type having an initial filling amount of 100 g. The user can select one of the three types of the developing apparatus 4 to be installed in the apparatus main body 100A according to use frequency and costs. This provides an appropriate degree of freedom.

Information on the filling amount for the developing apparatus 4 is stored in a nonvolatile memory 200 as information specific to the developing apparatus. The nonvolatile memory 200 is, for example, a rewritable flash ROM that stores a system program configured to control the image forming apparatus, the number of recording sheets with images recorded thereon, information on the life of the developing apparatus, information on the remaining amount of the toner, various adjustment values, and the like. The nonvolatile memory 200 also stores, for example, system data indicative of the serial number and the production date of the apparatus. The nonvolatile memory 200 stores, in addition to the above-described information, information on the filing amount for the developing apparatus as information specific to the developing apparatus.

In the present embodiment, the information on the filling amount of the toner is based on the filling amounts held in the nonvolatile ROM. However, information used to determine the filling amount is not limited to this. Any of the following pieces of information may be used instead so long as the information allows a difference in the filling amount of the toner to be determined: the nominal life of the developing apparatus and the number of sheets that can be printed by the developing apparatus, the lifetime limit number of rotations of the developing roller, the amount of toner available, or the lifetime limit number of rotations of the corresponding photosensitive drum. The present embodiment uses the information on the filling amount of the developer, but the nonvolatile memory 200 may hold information on the amount of the developer stored in the developing apparatus in the unused state (new developing apparatus).

[Filling Amount Detecting Means]

A CPU 100B (FIG. 2) is arranged in the image forming apparatus as a central processing unit. The CPU is a control portion that reads the various adjustment values from the nonvolatile memory mounted in the developing apparatus to control the image forming apparatus. The CPU detects, in the nonvolatile memory, the information on the initial filling amount for the developing apparatus and selects one of the discharge control programs predetermined for the respective filling amounts. The selected discharge control program then performs control. In the present embodiment, the filling amount of the toner in the developing apparatus is determined based on the information in the nonvolatile memory. However, the present invention is not limited to this. The filling amount of the toner may be detected as needed by, for example, changing a container shape (for example, a rib) for the developing apparatus according to the filling amount of the toner and allowing the image forming apparatus to detect a difference in container shape.

[Discharge Control]

Now, control for discharge of the coating agent in the present embodiment will be described in detail. The coating agent applied to the developing roller 17 during the initial period of use of the developing apparatus is mostly collected on the surface of the toner supply roller 20 and inside the toner supply roller 20 due to rotation rubbing between the developing roller 17 and the supply roller 20.

Since the coating agent in the present embodiment is characterized by having higher charge than the toner, the discharge control needs to be performed at potential settings different from potential settings for normal image formation. That is, a potential difference is caused which has a polarity opposite to the polarity with which the coating agent is charged by the developing blade 21; the potential difference has a larger absolute value than a potential difference resulting from an image forming operation. Specifically, a DC bias is applied to the toner supply roller 20 by a bias power supply 20c and to the developing roller 17 by a bias power supply 17c such that the developing roller 17 has a potential V of +300 V with respect to the potential of the toner supply roller 20. The bias power supplies 20c and 17c and the CPU 100B, which controls the application of the bias to the toner supply roller 20 and the developing roller 17, correspond to a voltage applying portion in the present invention. Since Tospearl, which is used as the coating agent in the present embodiment, has higher charging characteristics than the toner in the toner storage chamber 18, the coating agent is electrostatically fed to the developing roller 17, which has an apparently positive potential. In this manner, the potential settings based on the electrical characteristics of the coating agent enable the coating agent remaining in the toner supply roller 20 to be actively fed to the developing roller 17.

When subjected to a solid-black-image forming operation corresponding to one circumference of the developing roller 17 along with the toner, the coating agent thus collected in the developing roller 17 moves to the photosensitive drum 1 along with the toner and collected in a cleaner container. This operation enables a reliable reduction in the amount of coating agent remaining in the developing chamber. The discharge control also supplies the lubricant to the cleaning member 6. At this time, the intermediate transfer belt 5 and the photosensitive drum 1 are separate from each other, and thus the toner moved from the developing apparatus 4 to the photosensitive drum 1 is all collected in the cleaning member 6.

The present embodiment sets the above-described potentials because of the use of the coating agent having higher charging characteristics than the toner. However, the present invention is not limited to this. The potentials may be set so as to allow efficient discharge to be achieved in accordance with the electrical characteristics of the coating agent.

[Toner Discharge Control Flow]

Toner discharge control in Embodiment 1 will be described with reference to FIG. 4. FIG. 4 illustrates a flowchart of a discharging operation in Embodiment 1. In the present embodiment, as described above, the CPU in the image forming apparatus switches an operational condition for the discharging operation between (4) t4 and (12) t11 and (15) t13 in accordance with the initial-filling-amount information in the nonvolatile memory. In particular, the present embodiment is characterized in that the control program for the discharging operation allows the coating agent to be more actively discharged for the developing apparatus with a smaller filling amount. In the present embodiment, the predetermined count number of sheets printed is used as a discharge frequency, and the developing apparatus with a smaller filling amount starts to undergo the discharge control at a smaller print count number than the developing apparatus with a larger filling amount.

In the present embodiment, the CPU 100B also functions as a storage amount detecting portion that detects the initial filling amount of the developer toner (storage amount), a discharge control portion that changes the execution frequency for the discharging operation (operational condition), a count portion that counts the number of executions of the image forming operation, a life detecting portion, a remaining amount detecting portion, and the like.

(1) The filling amount detecting means allows the image forming apparatus to detect the filing amount of the toner in the developing apparatus (t1).

(2) The detection result indicates that the filling amount is 100 g (t2).

(3) The detection result indicative of 100 g is transmitted to toner discharge control means (t3).

(4) Detection means selects a discharge frequency of 100 sheets corresponding to a filling amount of 100 g (t4).

(5) Normal image formation is performed (t5).

(6) A count in a counter is incremented each time an image is formed (t6).

(7) A given number of sheets are fed and then count in the counter reaches the predetermined count number (t7).

(8) The discharge control means detects the arrival of the sheets at the counter to perform the discharging operation (t8).

(9) Once the discharging operation is ended, the counter is reset to zero (t9).

(10) The process subsequently returns to (t5) and loops from (t5) to (t9).

(11) At (t2), a detection result indicative of 150 g is transmitted to the toner discharge control means (t10).

(12) The detection means selects a discharge frequency of 300 sheets corresponding to a filling amount of 150 g (t11).

(13 ) As is the case with 100 g, the process subsequently loops from (t5) to (t9).

(14) At (t2), a detection result indicative of 240 g is transmitted to the toner discharge control means (t12).

(15) The detection means selects a discharge frequency of 600 sheets corresponding to a filling amount of 240 g (t13).

(16) As is the case with 100 g, the process subsequently loops from (t5) to (t9).

<Comparative Verification>

The configuration in the embodiment of the present invention was verified using the present embodiment and comparative examples described below in order to verify the effect of the discharging performance for the coating agent. The filling amount of toner in a developing device was 150 g.

Embodiment 1

Embodiment 1 of the present invention is a configuration that performs the operation during the discharge in the above-described embodiment and the discharge control flow (FIG. 4). In Embodiment 1, the discharge control program in the CPU in the image forming apparatus sets the predetermined count number of sheets printed to be the discharge frequency. The developing apparatus with a smaller filling amount starts to undergo the discharge control at smaller print intervals than the developing apparatus with a larger filling amount.

Comparative Example 1

Related Art

In Comparative Example 1, during low-printing intermittent durability tests, the toner is sequentially discharged so as to achieve a predetermined printing rate as described above in the BACKGROUND OF THE INVENTION. In the present comparative example, the toner discharging operation is controllably performed as needed so as to achieve a printing rate of 5%.

Comparative Example 2

Related Art

In Comparative Example 2, the potential settings for execution of the discharge control are the same as the potential settings for the normal image formation. The frequency and the discharge amount are similar to the frequency and the discharge amount in Embodiment 1. The filling amount of the toner is 150 g.

Embodiment 2

FIG. 5 illustrates a discharge control flow for Embodiment 2 of the present invention. In Embodiment 2, the discharge control program in the CPU in the image forming apparatus sets the frequency (operational condition) such that the discharging operation is performed each time a development life held in the nonvolatile memory decreases by a predetermined percentage, and varies the frequency (operational condition) according to the filling amount. That is, for the largest filling amount of 240 g, the discharging operation is performed each time the development life decreases by 3% (t16). For the smallest filling amount of 100 g, the discharging operation is performed each time the development life decreases by 1% (t14). For an intermediate filling amount of 150 g between the largest and smallest filling amounts, the discharging operation is performed each time the development life decreases by 2% (t15). The development life as used herein refers to the rate of the remaining life based on the number of rotations of the developing roller. The remaining part of the configuration is similar to the configuration in Embodiment 1.

Embodiment 3

Figure 6:
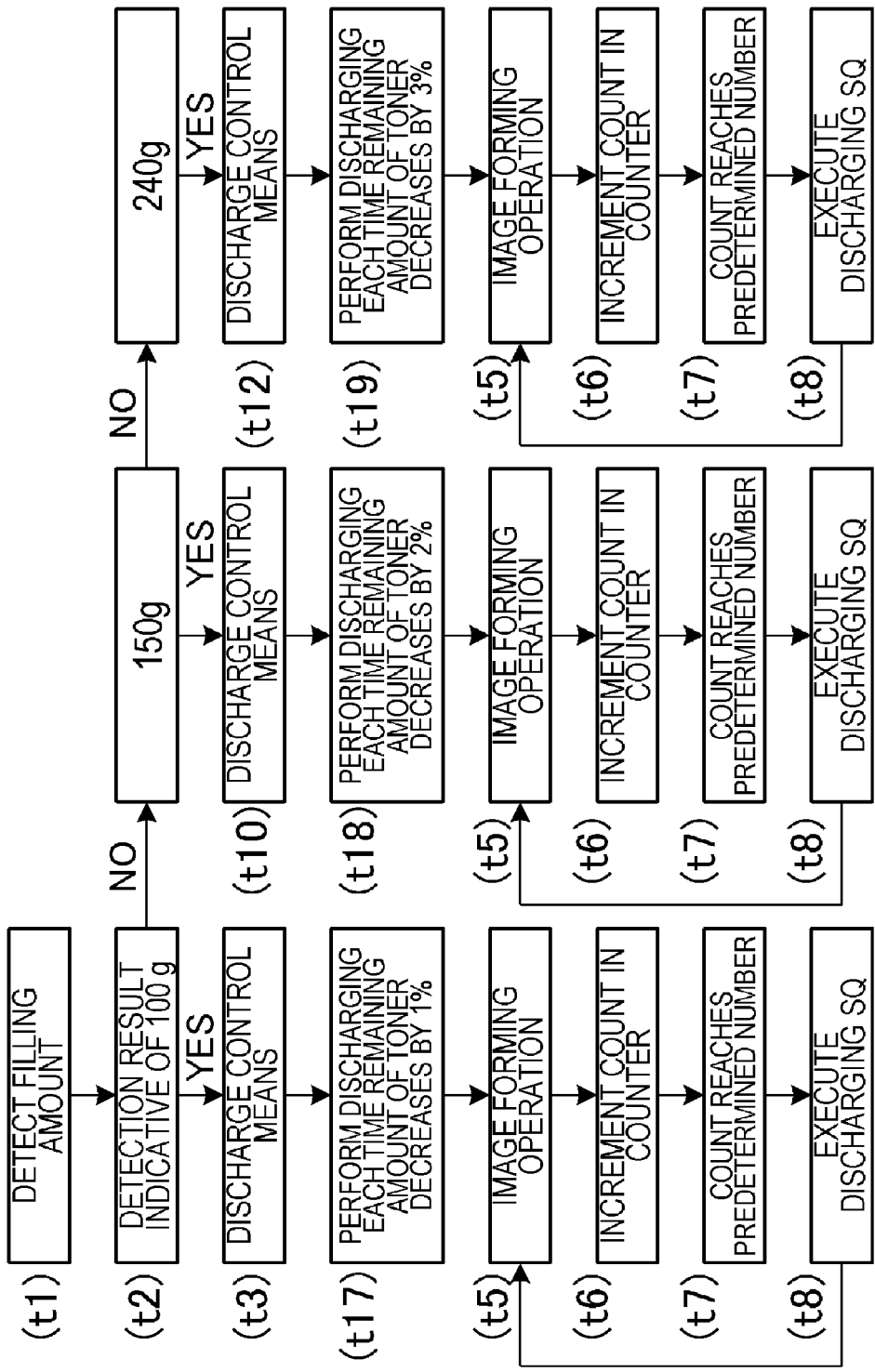
FIG. 6 is a flowchart of a discharging operation in Embodiment 3.

FIG. 6 illustrates a discharge control flow for Embodiment 3 of the present invention. In Embodiment 3, the discharge control program in the CPU in the image forming apparatus sets the frequency (operational condition) such that the discharging operation is performed each time the remaining percentage of toner held in the nonvolatile memory decreases by a predetermined percentage, and varies the frequency (operational condition) according to the filling amount. That is, for the largest filling amount of 240 g, the discharging operation is performed each time the remaining percentage of toner decreases by 3% (t19). For the smallest filling amount of 100 g, the discharging operation is performed each time the remaining percentage of toner decreases by 1% (t17). For an intermediate filling amount of 150 g between the largest and smallest filling amounts, the discharging operation is performed each time the remaining percentage of toner decreases by 2% (t18). The remaining part of the configuration is similar to the configuration in Embodiment 1.

Embodiment 4

FIG. 7 illustrates a discharge control flow for Embodiment 4 of the present invention. In Embodiment 4, the discharge control program in the CPU in the image forming apparatus performs the discharge control by varying the discharge amount during discharge (operational condition) according to the filling amount. That is, for the largest filling amount of 240 g, the discharge amount during discharge (operational condition) is such that the discharging operation is performed each time the developing roller (D roller) rotates a distance equal to two circumferences thereof (t22). For the smallest filling amount of 100 g, the discharging operation is performed each time the developing roller (D roller) rotates a distance equal to 10 circumferences thereof (t20). For an intermediate filling amount of 150 g between the largest and smallest filling amounts, the discharging operation is performed each time the developing roller rotates a distance equal to five circumferences thereof (t21). The discharge frequency is such that the discharging operation is performed each time 500 printed and fed sheets are counted regardless of the initial filling amount. The remaining part of the configuration is similar to the configuration in Embodiment 1.

<Verification 1: Relation between the Residual Concentration of the Coating Agent and Streaks>

To confirm the effect of discharging performance for the coating agent, low-printing intermittent durability tests were conducted on the developing apparatuses using the discharging method in the above-described comparative example to check whether or not an abnormal image was generated.

[Method]

In an environment at a temperature of 15° C. and a humidity of 10%, image formation was performed at a low printing rate at intervals of two sheets using the image forming apparatus in the present embodiment. Images were periodically checked to determine whether an abnormal image was generated. Durability evaluation was performed on using a new cyan toner in the unused state, and the initial filling amount of the toner was 150 g. The amount of coating agent applied to the developing roller was set to 50 mg for all of the developing apparatus.

[Results]

Table 1-1 in FIG. 8 illustrates the results of the present verification. A state where no streaks are generated on the images is denoted by A in the table. A state where streaks on the images have a length of less than 2 cm is denoted by B in the table. A state where streaks on the images have a length of 2 cm or more is denoted by C in the table. The results indicate that all of Embodiments 1 to 4 successfully suppressed generation of an abnormal image. This will be described below in detail.

<Verification 2: Verification of the Discharging Performance>

The developing apparatus used for the durability tests in Verification 1 was used to rotationally drive the developing roller. Whether the coating agent (Tospearl) was developed on the developing roller (whether the peeled-off coating agent was attached to the developing roller again) was visually checked.

[Method]

In an environment at a temperature of 15° C. and a humidity of 10%, the developing apparatuses used in Verification 1 were used and the remaining amount of the toner resulting from the durability tests was set to 30 g for all of the developing apparatuses. The developing roller was rotated for development with no toner consumed. The state of the coat on the developing roller was visually checked to determine whether Tospearl was developed. The potential settings for the driving for development were equal to the potential settings for the discharging operation. The state of the toner coat on the developing roller after one-minute driving was checked.

[Results]

Table 1-2 in FIG. 8 illustrates the results of the present verification. Circles "○" in the table indicate the absence of the coating agent on the developing roller. Crosses "×" in the table indicate that the presence of the coating agent on the developing roller was confirmed. Embodiments 1 to 4 produced favorable results indicating that no coating agent was coated on the developing rollers. This will be described below in detail.

Verification 3: Verification of the Discharging Performance>

The same examinations as those in Verification 2 were executed. That is, the developing roller was rotationally driven with no toner consumed. Whether the coating agent coated on the developing roller was visually checked.

[Method]

In an environment at a temperature of 15° C. and a humidity of 10%, the developing apparatuses filled with 30 g of new toner were prepared, and the developing roller was rotated for development with no toner consumed. The state of the coat on the developing roller was visually checked to determine whether Tospearl was developed. The potential settings for the driving for development were equal to the potential settings for the discharging operation. The state of the toner coat on the developing roller after one-minute driving was checked. The amount of the coating agent was 50 mg.

[Results]

Table 1-3 in FIG. 8 illustrates the results of the present verification. Circles "○" in the table indicate the absence of the coating agent on the developing roller. Crosses "×" in the table indicate that the presence of the coating agent on the developing roller was confirmed. Even with the new toner, Embodiments 1 to 4 produced favorable results indicating that no coating agent was coated on the developing rollers. This will be described below in detail.

<Verification Results>

Advantages of Embodiments 1 to 4 of the present invention over Comparative Example 1 will be described. The reason why abnormal images were generated in the configuration in Comparative Example 1 is expected to relate to the results of Verification 2. That is, during the latter half of the durability tests, a large amount of coating agent was present in the developing chamber, resulting in the likelihood that the coating agent was developed. Two causes are possible. First, the manner of discharging the coating agent was problematic, and the coating agent was actually likely to have failed to be discharged. Second, the discharge frequency corresponding to a constant printing rate limits the amount of coating agent discharged at a time. This is expected to reduce discharge efficiency to cause streak images to be generated.

Advantages of the present invention over Comparative Example 2 will be described. The potential control in Comparative Example 2 fails to efficiently discharge the coating agent, leading to a reduced discharge efficiency for the coating agent. Thus, during the latter half of the durability tests, the residual concentration of the coating agent is expected to have increased to cause streak images to be generated.

The results of the verifications by the present inventors indicate that a high residual concentration of the coating agent causes the coating agent to be developed on the developing roller. In particular, this tendency is significant when the toner is degraded.

With reference to FIG. 9 and FIG. 10, the results of verifications 2 and 3 will further be verified. FIG. 9 is a graph illustrating the results of Verifications 2 and 3 in terms of the residual concentration of the coating agent and the coat of the developer. FIG. 10 is a diagram illustrating the residual concentration of the coating agent and the coat of the developer. Ranking on the axis of ordinate in the graph in FIG. 9 represents five ranks of the amount of coating agent developed on the developing roller. The graph indicates that the amount of coating agent developed on the developing roller decreases consistently with the residual concentration of the coating agent. The graph also indicates that, even with the same residual concentration, the likelihood of development of the coating agent varies depending on the degradation status of the toner. In particular, the toner with the durability thereof degraded tends to make the coating agent likely to be developed. This is because, as depicted in FIG. 10, degraded charging performance of the toner makes the coating agent with high charging performance likely to be coated on the developing roller.

Based on the above-described examinations, in Embodiments 1 to 4, the coating agent is intermittently discharged to the outside of the developing chamber so as to set the residual concentration of the coating agent to less than 0.005%, at which generation of abnormal images is prevented even with the toner with the durability thereof degraded. To achieve such discharge, different discharge control programs are prepared for the respective initial weights and the discharge control for the coating agent is performed using a method optimum for the initial weight. In Embodiments 1 to 4, abnormal images attributed to the coating agent can be suppressed by performing the discharge control for the developing apparatus with a small filling amount on the developing apparatus with a large filling amount of the toner. However, the coating agent is discharged along with the toner, and thus, an increased discharge frequency for the developing apparatus with a large filling amount of the toner undesirably reduces the amount of the toner that can be used for image formation by the user. Thus, in Embodiments 1 to 4, the appropriate control is performed such that the operational condition for the discharging operation is varied according to the filling amount of the toner in the developing apparatus to allow maximization of the amount of the toner that can be used by the user while reducing possible abnormal images attributed to the residual coating agent.

As described above, the developing apparatuses in Embodiments 1 to 4 exhibited the lowest residual concentration of the coating agent after the durability tests. The results of the examinations by the inventors indicate that the discharge efficiency can be increased by setting the potentials optimum for discharge according to the electrical characteristics of the coating agent. For the developing apparatus with a smaller filling amount, the residual concentration of the coating agent can be reduced by increasing the discharge frequency or the discharge amount (varying the operational condition).

As described above, for a new developing apparatus in which the developer bearing member is coated with powder other than the developer used for image formation, the present embodiment can effectively perform control that allows the coating agent to be reliably discharged to the outside the developing chamber. Thus, even in a situation where the charging characteristics of the toner are degraded as a result of deterioration of durability of the developer or degradation of the developer bearing member, the amount of residual coating agent reliably decreases, enabling a reduction in inappropriate images attributed to the initially applied coating agent. Therefore, image formation can be stably achieved throughout the life of the developing apparatuses.

In the above-described embodiment, the image forming apparatus capable of forming color images is illustrated. However, the image forming apparatus to which the present invention can be applied is not limited to this. Similar effects can be produced by an image forming apparatus capable of forming monochromatic images. Similarly, the present embodiment adopts the contact developing system using the nonmagnetic one-component toner. However, the present invention is not limited to this. Similar effects can be produced by adopting a jumping developing scheme.

In the above-described embodiment, operation of discharging the powder other than the developer depending on the filling amount of the toner in the developing apparatus is controlled such that the amount of the developer discharged per unit number of printed sheets is controllably increased for the developing apparatus with a smaller filling amount of the toner.

In other words, the discharging operation of discharging the powder other than the developer is controlled such that the first amount of the powder discharged when the first amount of the developer is detected is larger than the second amount of the powder discharged when the second amount of the developer that is larger than the first amount of the developer is detected. In this case, means used is not particularly limited, and for example, the amount of the powder discharged at a time may be increased, or the number of times that the powder is discharged may be increased with the same amount of the powder discharged.

As a result, the amount of the developer discharged per unit number of printed sheets may be increased with decreasing initial content of the developer.

Moreover, the present invention is not limited to the above-described configuration. Any configuration may be used as needed so long as the configuration increases the amount of the developer discharged per unit number of printed sheets for the developing apparatus with a smaller filling amount of the toner, in order to accomplish various purposes such as suppression of degradation of the toner, stabilization of cleaning performance of the photosensitive drum, and stabilization of cleaning of the intermediate transfer member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121021, filed on Jun. 16, 2015, and Japanese Patent Application No. 2016-100627, filed on May 19, 2016, which are hereby incorporated by reference herein in their entirety.

What is claimed is:

1. An image forming apparatus comprising:
    an image bearing member configured to bear a developer image;
    a developing apparatus having a developer bearing member that bears developer and a regulating member that regulates an amount of the developer on the developer bearing member;
    a detection portion that detects the amount of the developer stored in the developing apparatus; and
    a control portion that performs a discharging operation for discharging the developer from the developing apparatus, apart from an image forming operation,
    wherein the developer bearing member bears a coating agent during an unused state, and
    in the discharging operation, a first amount of the developer discharged, when a first amount of the developer stored is detected, is larger than a second amount of the developer discharged when a second amount of the developer stored, that is larger than the first amount of the developer stored, is detected.

2. The image forming apparatus according to claim 1, further comprising a voltage applying portion that applies, to the developer bearing member, a voltage causing a potential difference between the developer bearing member and a supply member,
    wherein the voltage applying portion applies, during the discharging operation, a voltage that causes a first potential difference with a magnitude different from a magnitude of a potential difference caused during the image forming operation, to the developer bearing member.

3. The image forming apparatus according to claim 1, wherein the coating agent is powder having higher charging characteristics than the developer.

4. The image forming apparatus according to claim 2, wherein the voltage applying portion applies, during the discharging operation, a voltage that causes the first potential difference having a polarity opposite to a charging polarity of the coating agent charged by the regulating member and having a larger absolute value than a second potential difference caused during the image forming operation, to the developer bearing member.

5. The image forming apparatus according to claim 1, further comprising a count portion that counts a number of executions of the image forming operation,
wherein the discharging operation is executed when a count in the count portion reaches a predetermined value, and the control portion increases an execution frequency of the discharging operation by reducing the predetermined value consistently with a decreasing initial amount of the developer stored.

6. The image forming apparatus according to claim 1, further comprising a life detecting portion that detects a rate of a remaining life of the developer bearing member or the image bearing member,
wherein the discharging operation is executed each time the rate of the remaining life detected by the life detecting portion decreases by a predetermined percentage, and
the control portion increases an execution frequency of the discharging operation by reducing the predetermined percentage consistently with a decreasing initial amount of the developer stored.

7. The image forming apparatus according to claim 6, wherein the remaining life is based on a number of rotations of the developer bearing member or the image bearing member.

8. The image forming apparatus according to claim 1, further comprising a remaining amount detecting portion that detects a ratio of a remaining amount of the developer to an initial amount of the developer stored,
wherein the discharging operation is executed each time the ratio of the remaining amount detected by the remaining amount detecting portion decreases by a predetermined percentage, and
the control portion increases an execution frequency of the discharging operation by reducing the predetermined percentage consistently with a decreasing initial amount of the developer stored.

9. The image forming apparatus according to claim 2, further comprising a count portion that counts a number of rotations of the developer bearing member,
wherein the discharging operation is executed when a count in the count portion reaches a predetermined value, and the control portion increases an execution frequency of the discharging operation by reducing the predetermined value consistently with a decreasing initial amount of the developer stored.

10. The image forming apparatus according to claim 1, further comprising a supply member that contacts the developer bearing member to supply the developer to the developer bearing member.

11. The image forming apparatus according to claim 1, wherein at least the developer bearing member and the regulating member are integrated together into a cartridge and enabled to be installed in and removed from an apparatus main body of the image forming apparatus.

12. The image forming apparatus according to claim 1, wherein the coating agent has a smaller average particle size than the developer.

13. An image forming apparatus comprising:
an image bearing member configured to bear a developer image;
a developing apparatus including a developer bearing member that bears developer and a regulating member that regulates an amount of the developer borne by the developer bearing member and that charges the developer; and
a detection portion that detects the amount of the developer stored in the developing apparatus,
the image forming apparatus executing a discharging operation that is different from an image forming operation of forming the developer image on a recording material and that moves the developer from the developer bearing member to the image bearing member,
wherein a coating agent that is powder other than the developer is applied to the developer bearing member during an unused state, and
the image forming apparatus comprises a control portion that varies an execution frequency of the discharging operation so as to increase the execution frequency of the discharging operation with respect to an execution frequency of the image forming operation as the amount of the developer detected by the detection portion decreases.

* * * * *